US007711735B2

(12) United States Patent
Wu et al.

(10) Patent No.: US 7,711,735 B2
(45) Date of Patent: May 4, 2010

(54) USER SEGMENT SUGGESTION FOR ONLINE ADVERTISING

(75) Inventors: Min Wu, Beijing (CN); Chenxi Lin, Beijing (CN); Benyu Zhang, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 11/803,503

(22) Filed: May 15, 2007

(65) Prior Publication Data

US 2008/0288491 A1 Nov. 20, 2008

(51) Int. Cl.
 *G06F 17/30* (2006.01)
(52) U.S. Cl. .................... 707/737; 707/749
(58) Field of Classification Search ............ 707/102, 707/1, 101
See application file for complete search history.

(56) References Cited

U.S. PATENT DOCUMENTS

| | | | |
|---|---|---|---|
| 6,134,532 A | 10/2000 | Lazarus et al. | |
| 6,513,052 B1 | 1/2003 | Binder | |
| 6,714,975 B1 | 3/2004 | Aggarwal et al. | |
| 7,062,510 B1 | 6/2006 | Eldering | |
| 2001/0020238 A1* | 9/2001 | Tsuda | 707/5 |
| 2001/0037325 A1 | 11/2001 | Biderman et al. | |
| 2002/0147805 A1* | 10/2002 | Leshem et al. | 709/223 |
| 2003/0236879 A1* | 12/2003 | Moritani et al. | 709/224 |
| 2005/0021397 A1 | 1/2005 | Cui et al. | |
| 2005/0125441 A1* | 6/2005 | Clemens et al. | 707/103 X |
| 2006/0059135 A1 | 3/2006 | Palmon et al. | |
| 2006/0064411 A1* | 3/2006 | Gross et al. | 707/3 |
| 2006/0069612 A1 | 3/2006 | Hurt et al. | |
| 2006/0069616 A1 | 3/2006 | Bau | |
| 2007/0143484 A1* | 6/2007 | Drouet et al. | 709/227 |

FOREIGN PATENT DOCUMENTS

WO WO0120481 A2 3/2001

OTHER PUBLICATIONS

Rong Jin et al., "An automatic weighting scheme for collaborative filtering", Annual ACM Conference on Research and Development in Information Retrieval, p. 337-344, Jul. 2004. Retrieved from the Internet<URL: http://portal.acm.org/ft_gateway.cfm?id=1009051 &type= pdf&coll=ACM&dl=ACM&CFID=44370533 &CFTOKEN=29968139>.*

(Continued)

*Primary Examiner*—Jean B. Fleurantin
*Assistant Examiner*—Dennis Myint (57) ABSTRACT

Described is a behavioral targeting technology for online advertising, by which an original attribute is uniformly expanded. Users that meet an original attribute are aggregated into a mid-result used to determine similarity relative to candidate attribute types. The most similar candidate attributes are selected for the expanded attribute. A URL/URL pattern suggestion technology is provided, with similarity computed from users/URLs visited by the users. URLs are separated into URL tree nodes, for calculating the number of users who have visited each URL and the number of users who have visited the URL on a sub-tree whose root is the node. URL/URL patterns are output based on similarity. Domains are also suggested based on user-visits. Similarities between pairs of domains may be computed (e.g., offline), with an output for a given domain provided in based on its similarity with each other domain.

19 Claims, 9 Drawing Sheets

OTHER PUBLICATIONS

Xing et al., "The impact of search engine optimization on online advertising market", ACM International Conference Proceeding Series; vol. 156, p. 519-529, Jan. 2004. Retrieved from the Internet<URL: http://portal.acm.org/ft_gateway.cfm?id=1151531&type=pdf&coll=ACM&dI=ACM&CFID=68510004&CFTOKEN=33129941>.*

Sampath, et al., "Analyzing clusters of web application user sessions", International Conference on Software Engineering, p. 1-7, May 17, 2005. Retrieved from the Internet: <URL: http://portal.acm.org/ft_gateway.cfm?id= 1083255&type=pdf&coll=GUIDE&dI=GUIDE&CFID= 68509447&CFTOKEN=39618228>.*

Browning, et al., "A Maximum Entropy Approach for Collaborative Filtering", http://ieeexplore.ieee.org/ie15/7505/20420/00943105.pdf?isNumber=.

Middleton Stuart Edward, "Capturing Knowledge of User Preferences with Recommender Systems", Date: May 2003, http://eprints.ecs.soton.ac.uk/7857/01/Thesis-final-lowres.pdf.

Muntean Cristina Hava, Quality of Experience Aware Adaptive Hypermedia System, Date: Apr. 2005, http://www.eeng.dcu.ie/~pel/graduates/CristinaHavaMuntean-PhD-Thesis.pdf.

* cited by examiner

USER SEGMENT SUGGESTION FOR ONLINE ADVERTISING

BACKGROUND

In the context of online advertising, behavioral targeting refers to the ability, through the use of anonymous data, to deliver advertisements to consumers based on their recent behavior. In this kind of advertisement model, advertisers review and buy a user segment to which they deliver their advertisements. For example, a video game advertiser may be interested in a user segment corresponding to users that have queried for "Xbox games" and/or have visited www.xbox.com, and so forth.

More formally, a user segment in a behavioral targeting system is defined as some user conditions met relative to some attributes, wherein each attribute represents the behavior of a set of users, such as the queries they have searched, or some set of URLs they have visited. There are several types of attributes; e.g., the URL pattern attribute represents the URLs the users visit, the query attribute represents the queries the users search in the search engine, the URL domain attribute represents the URL domain the users visit, and the product and service attribute represents the product and/or the service the users consume.

Attribute expansion tools have been developed to help advertisers define reasonably good user segments. With these expansion tools, advertisers can reach more users by expanding the set of users that meet certain attributes. The core functionality of these tools is to expand a set of attributes according to the original attributes provided by the advertiser.

The simplest way to do such an expansion is to write a separate algorithm for each special type of attribute expansion, e.g. an algorithm for expanding the query attribute to the URL pattern attribute. However, if there are N types of attributes, this technique requires writing N*N different expansion algorithms to meet the different expansion requirements.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology in a behavioral targeting environment by which an original attribute is expanded into an expanded attribute set, including by aggregating users that meet the original attribute into a mid-result, and using the mid-result to determine user similarity relative to each of a plurality of candidate attribute types. The candidate attribute types are sorted by their determined user similarity into sorted candidate attributes, with a subset (e.g., the topmost similar N) of the sorted candidate attributes selected for the expanded attribute.

Another aspect described is a technology in a behavioral targeting environment that suggests URL and/or URL patterns from a set of users and information on URLs visited by the set of users. The URL and/or URL patterns are computed by separating at least some URLs into a data structure, such as nodes of a URL tree. The number of users in the user set who have visited the URL corresponding to the node is calculated, along with the number of users in the set of users who have visited the URL on a sub-tree whose root is the node. The user set intersection between an input user set and a user set on each node is determined, and URL similarity and/or URL pattern similarity is computed and output in decreasing order of similarity to determine the URL and/or URL patterns.

Another aspect described is a technology directed towards suggesting domains from a set of users and domains visited by the set of users. The suggested domains may be computed from a set of users comprises by determining similarity between pairs of domains, which may be determined offline with respect to an online behavioral targeting system. More particularly, a similarity between each pair of domains may be computed using a Pearson coefficient function, with an output for a given domain provided in decreasing order of similarity with respect to each other domain.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards improved behavioral targeting in the context of online advertising, including by providing a uniformed attribute expansion mechanism (algorithm) that simplifies the expansion between various attribute types. Further, unlike other types of attributes, there is provided a way to suggest the URL patterns and/or domains for a set of users.

As will be understood, various examples are shown that facilitate a uniformed attribute expansion mechanism and suggestion of a user segment. However, these are only non-limiting examples for the purposes of describing the various concepts and aspects of the technology described herein. As such, the present invention is not limited to any particular embodiments, aspects, concepts, protocols, formats, structures, functionalities or examples described herein. Rather, any of the embodiments, aspects, concepts, protocols, formats, structures, functionalities or examples described herein are non-limiting, and the present invention may be used various ways that provide benefits and advantages in computing and online advertising technology in general.

Figure 1:
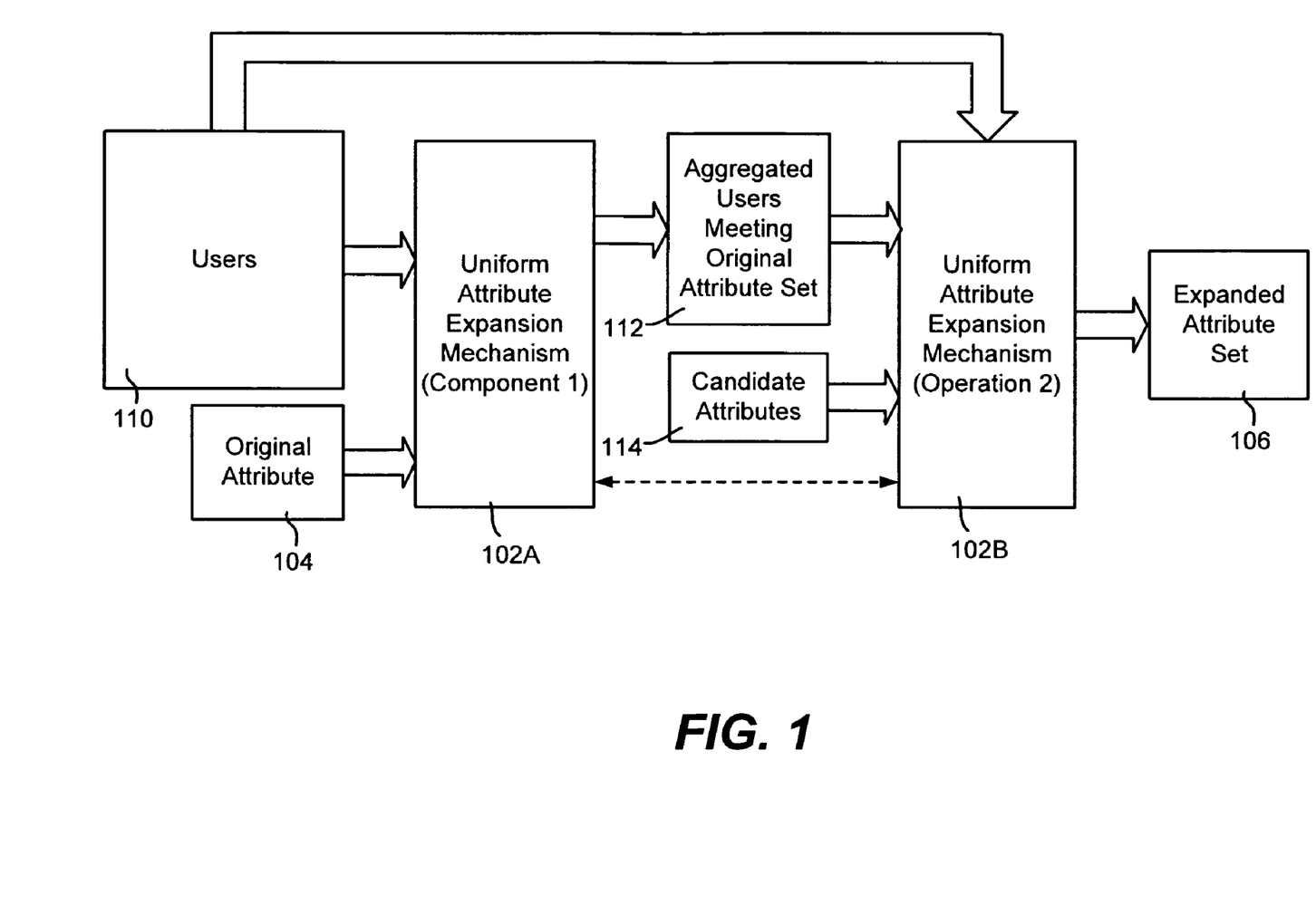
FIG. 1 is a block diagram representing a uniform attribute expansion mechanism that provides expanded attributes in a behavioral targeting system.

Turning to FIG. 1, there is shown a uniform attribute expansion mechanism 102A and 102B (e.g., implemented in the form of an algorithm) that simplifies the expansion between various attribute types. The input and the output of the algorithm are the original attribute 104 and the expanded attribute 106, respectively. The two attributes ordinarily have the same topic, and the expanded attribute can reach more users than the original attribute.

In one example implementation, the unified attribute expansion mechanism 102A and 102B generally includes a first example component 102A directed towards reaching a user set. In this component, the mechanism aggregates the users 110 who have met the original attribute into an aggregated user set 112. This aggregated user set 112 is the core target, to whom the advertiser wants to deliver this advertisement. Because the uniform expansion mechanism 102A and 102B supports different types of attribute expansion, the general concepts are similar to other aggregate approaches that reach a set of users.

In the example of FIG. 1, to expand with a new attribute, a set of candidate attributes 114 is defined and evaluated, in which each candidate attributes relates in some way to the users in the user set 112. For each candidate attribute in the set 114, a similarity value is computed in a second example component of the uniform attribute expansion mechanism 102B. For example, the user similarity value for each candidate attribute may be computed by u'/U, where U is the size of the user set of users belonging to that candidate attribute, and u' is the size of the user set belonging to both the candidate attribute and the original attribute. Candidate attributes are then sorted by user similarity, with some number N of the top (most similar) results chosen as the expanded attribute or attributes for the expanded attribute set 106.

Figure 2:
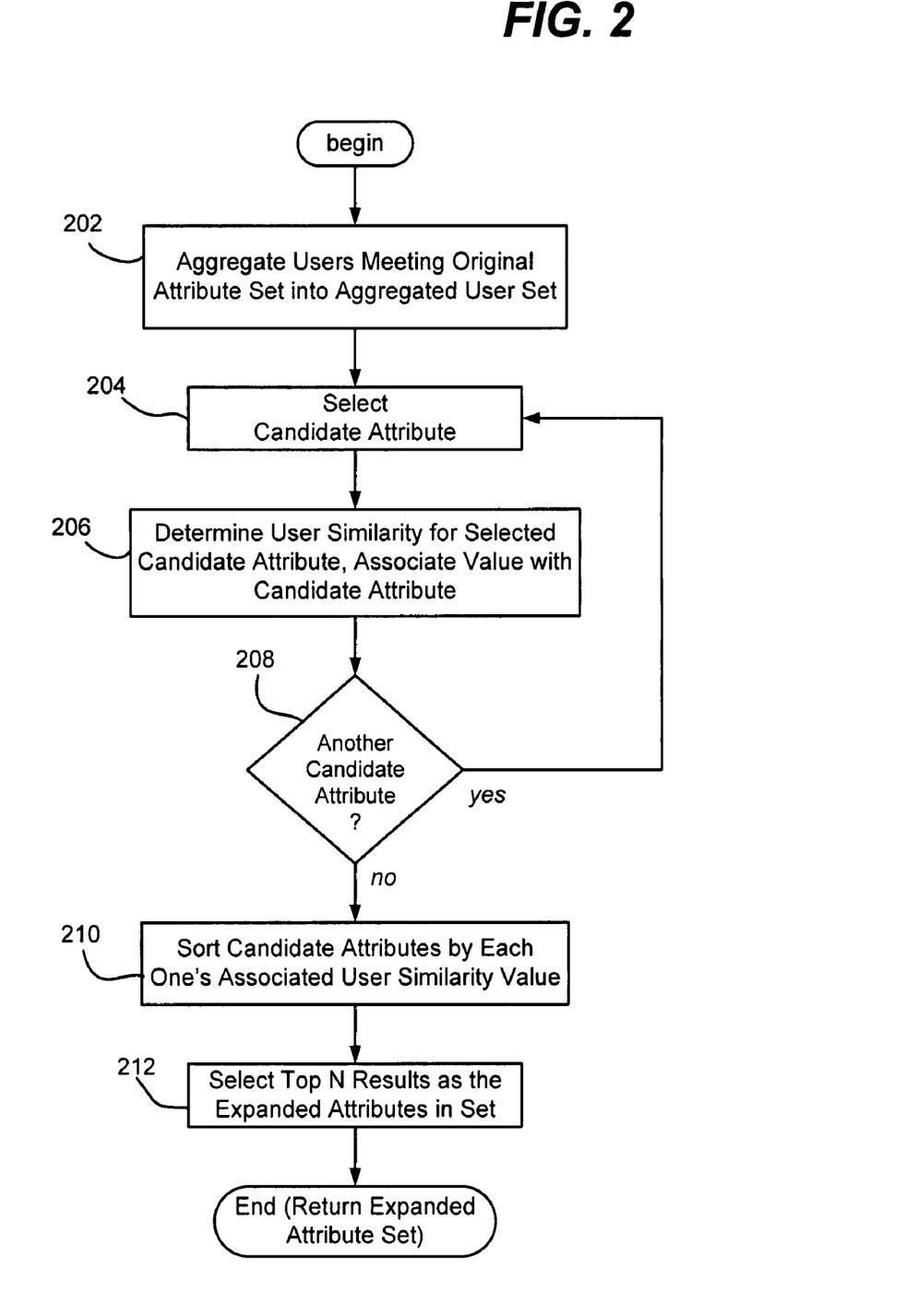
FIG. 2 is a flow diagram representing example steps taken by the uniform attribute expansion mechanism.

FIG. 2 summarizes the steps of the uniform attribute expansion mechanism components 102A and 102B. Step 202 represents the aggregation step as described above. Step 204 then selects a candidate attribute, with step 206 computing the similarity value for that candidate attribute and associating it with that candidate attribute.

Step 208 repeats the computation for other candidate attributes until all have been processed. Then, the similarity values associated with their respective candidates are used to sort the candidate attributes (step 210). The top N are then chosen as the expanded attribute or attributes in the set 106 (step 212).

Figure 3:
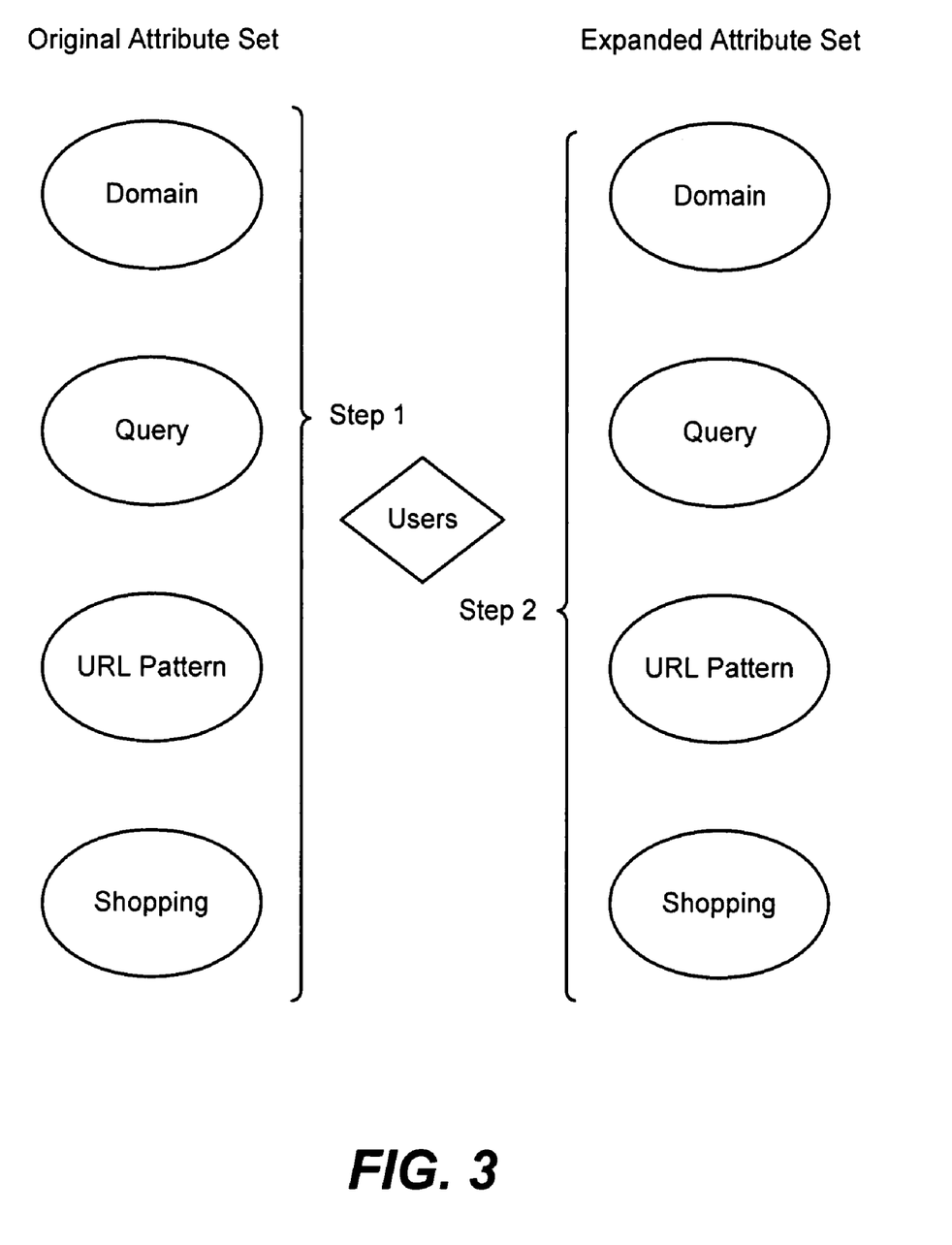
FIG. 3 is a representation of an expanded attribute provided by the uniform attribute expansion mechanism from an original attribute.

FIG. 3 is a representation of how each original attribute may be expanded to reach more users. As can be readily appreciated, leveraging the aggregated user set 112 as a mid-result of the attribute expansion unifies the expansion algorithm between various attribute types. Because the aggregation is already implemented (or is straightforward to implement) for different types of attributes, the unified attribute expansion only needs to implement N algorithms (where N is the chosen number of the attribute types) of the user set to expand the attributes for different type attributes.

Turning to another aspect, there is described a way to suggest URLs and URL patterns for a set of users in a behavioral targeting system. Note that compared with other types of attributes, there was heretofore not any known way to suggest URL patterns from a given set of users.

Figure 4:
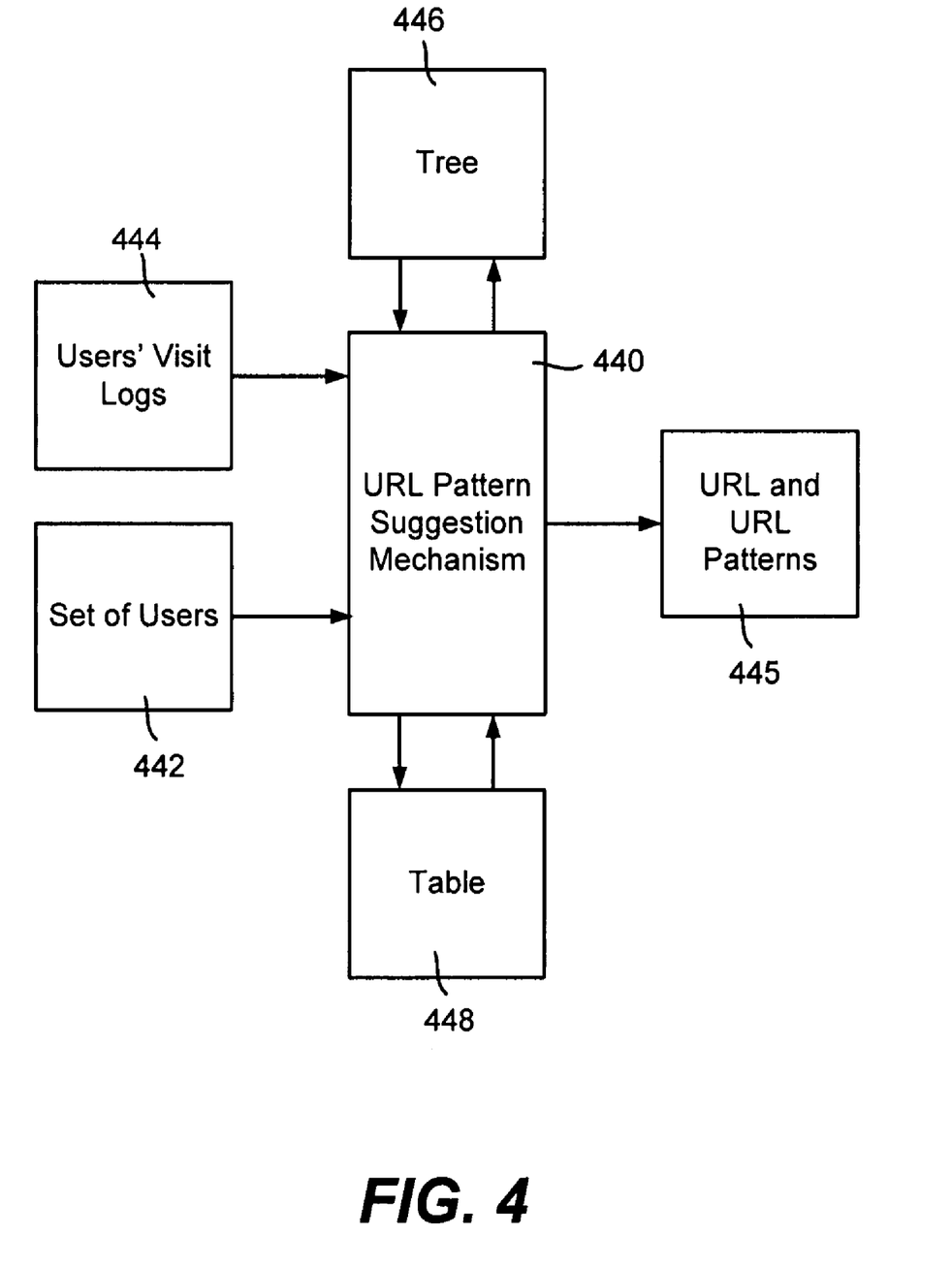
FIG. 4 is a block diagram representing a URL pattern suggestion mechanism that outputs URL and URL patterns for a set of users in a behavioral targeting system.

To suggest a URL pattern, as represented in FIG. 4, a URL pattern suggestion mechanism (e.g., an algorithm) 440 is provided that constructs a URL tree 442, whereby URLs and URL patterns can be suggested at the same time. The URL pattern suggestion mechanism 440 takes as inputs a set of users 442 and the URL visit log set 444 from the set of users. As described below, the mechanism 440 analyzes the log set 444 and outputs the URL and URL patterns 445 according to the user set in similarity decreasing order.

Figure 5:
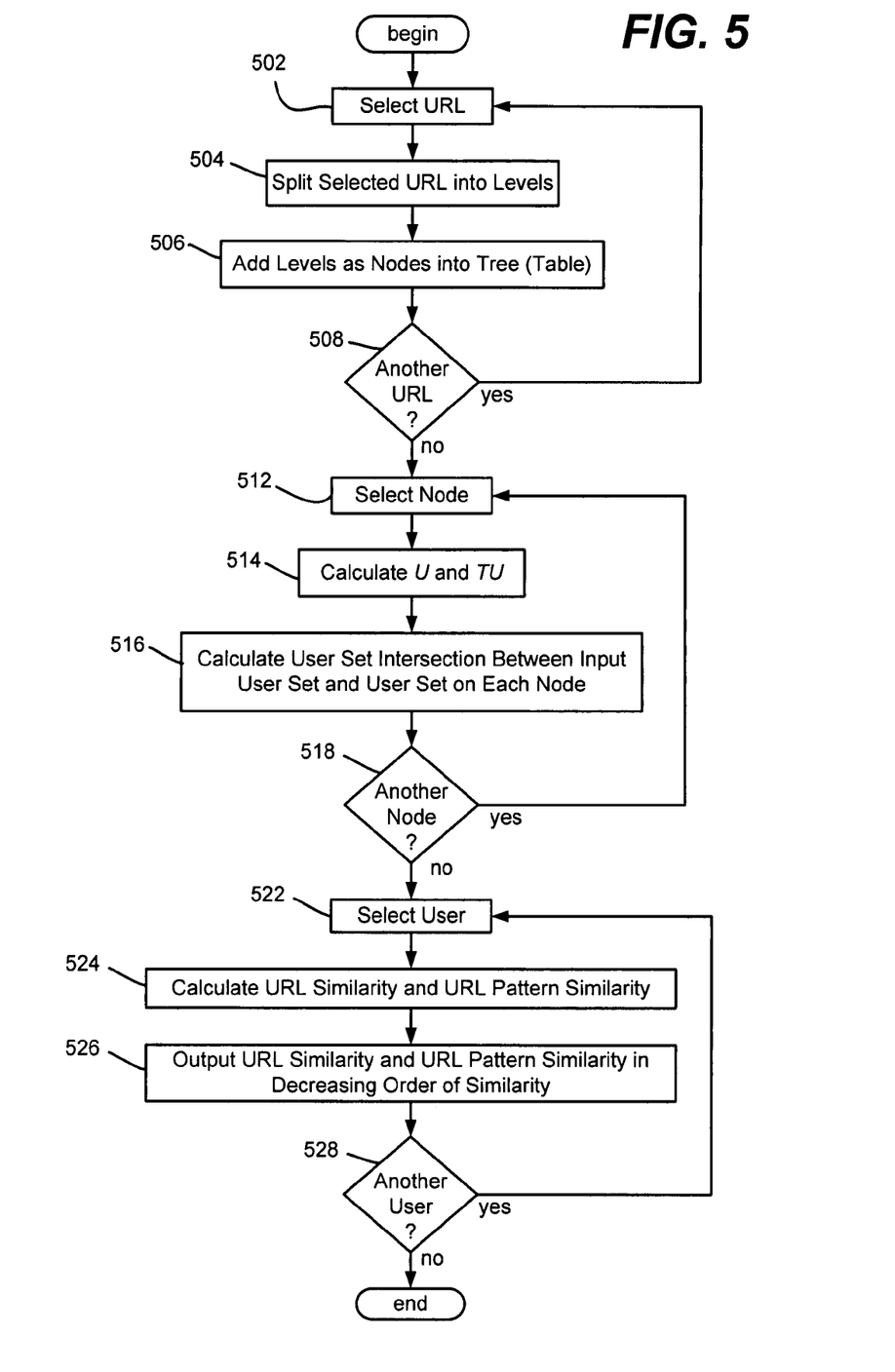
FIG. 5 is a flow diagram representing example steps taken by the URL pattern suggestion mechanism.

To this end, steps 502, 504 506 and 508 of the example flow diagram of FIG. 5 represent the building of a log tree 446. More particularly, for each URL as selected at step 502, at step 504 the URL is split into n levels, each level corresponding to a node in the tree 446. For example, given a URL such as http://update.microsoft.com/microsoftupdate/v6/default.aspx?ln=en-us, the URL may be split it into four levels, corresponding to http://a/b/c/d, each added into the tree 446 via step 506. Step 508 repeats the process for other URLs in the visit log 444.

Figure 6:
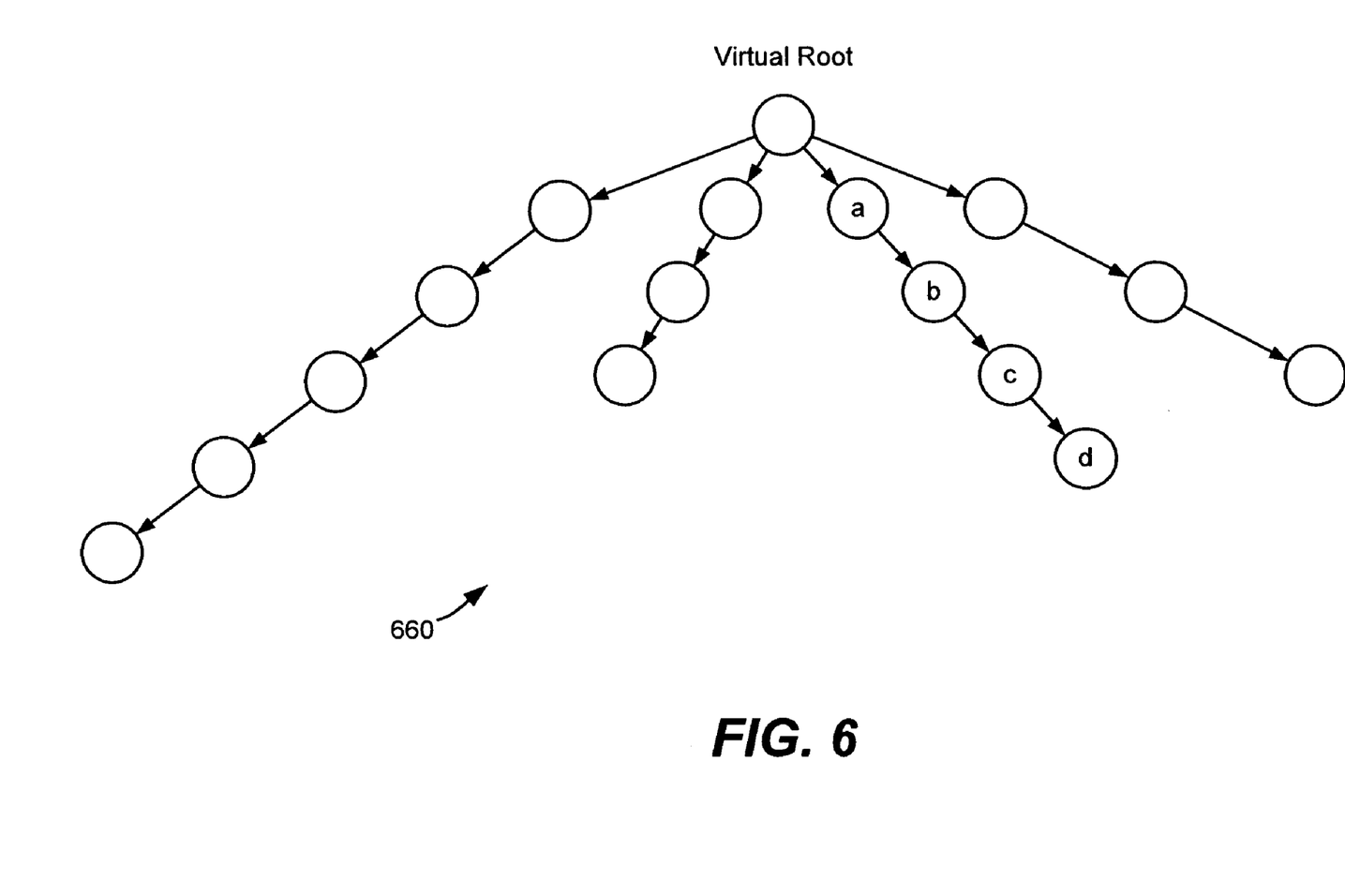
FIG. 6 is a representation of a URL tree corresponding to users' visit logs as processed by the URL pattern suggestion mechanism.

FIG. 6 represents a simple example tree 660 which includes the nodes corresponding to http://a/b/c/d. In this example, Node a represents "update.microsoft.com"; node b represents "microsoftupdate"; node c represents "v6" and node d represents "default.aspx?ln=en-us". In the URL tree 660, the node d represents the full URL, with nodes a, b and c being the ancestor nodes of node d. Note that adding each URL in the URL visit log 444 into the tree, as represented by step 506 (as repeated via step 508), provides the entire URL tree 660.

On each tree node, there are two user sets. For each node of URL tree (as processed via steps 512 and 518), step 514 calculates U, the number users in this user set who have visited the URL on the node, and TU, the number users in this user set who have visited the URL on the sub-tree whose root is the node. For example, if user X visits http://update.microsoft.com/microsoftupdate/v6/default.aspx?ln=en-us, then user X is counted in the U value for node d, and user X is also in the TU value for nodes a, b, c, d. As can be seen, for any leaf node (e.g., the node d) in the URL tree 550, U=TU; for any non-leaf node on the URL tree 660, U is a subset of TU, that is, $U \subseteq TU$.

Note that because the entire URL tree may be extremely large, it may take a relatively long time to calculate Ux and TUx for every node. However, most of the nodes are irrelevant to the user set, and thus a user-to-node table 448 (FIG. 4, in which arranging the users in either the columns or rows is equivalent) may be used, e.g.:

|        | User 0 | User 1 | User 2 | ... |
|--------|--------|--------|--------|-----|
| Node 0 | 6      | 0      | 4      |     |
| Node 1 | 0      | 1      | 0      |     |
| Node 2 | 0      | 0      | 7      |     |
| ...    |        |        |        |     |

Step 516 represents calculating the user set intersection between the input user set and the user set on each node. For example, if the input user set is $U_{input}$, for each node on the URL tree, the intersection is as follows:

$$U_X = U_{input} \cap U$$

$$TU_X = U_{input} \cap TU$$

For each user (steps 522 and 528), steps 524 and 526 represent calculating and outputting the suggested URL and URL patterns in decreasing order of similarity, where for a user X:

$$Similarity_{URL} = |Ux|/|U|$$

$$Similarity_{pattern} = |TUx|/|TU|$$

Figure 7:
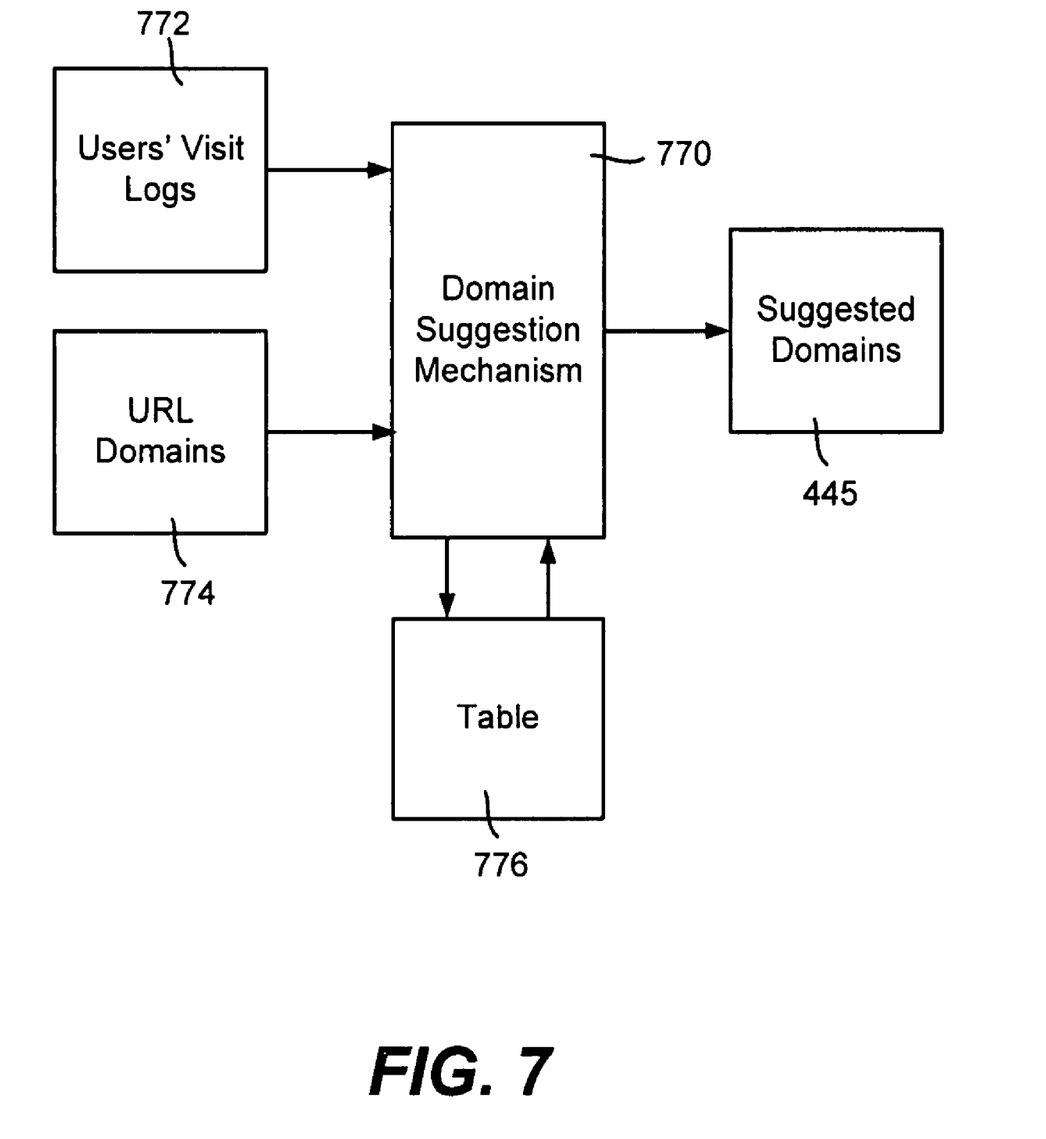
FIG. 7 is a block diagram representing a domain suggestion mechanism that outputs domains based on computed similarity in a behavioral targeting system.
Figure 8:
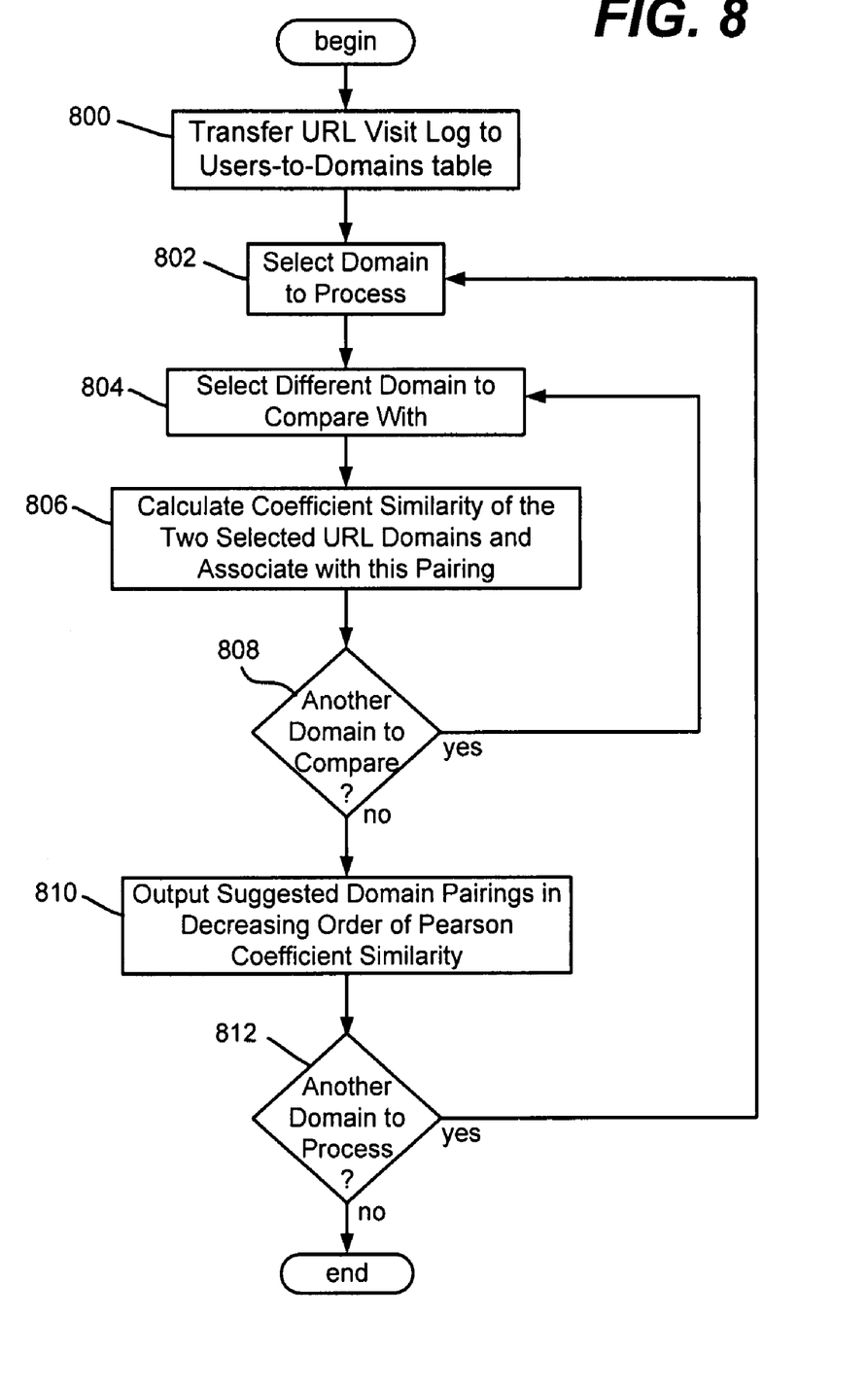
FIG. 8 is a flow diagram representing example steps taken by the domain suggestion mechanism.

In addition to URL suggestion and URL pattern suggestion, an example URL domain suggestion mechanism 770 (algorithm) may be employed, as generally represented in FIGS. 7 and 8. Note that in general, the URL domain attribute has limited value relative to other types of attributes (e.g., because the number of the URL domains visited is far less than the number of URL patterns or queries), whereby in one implementation, the results are calculated offline, which helps reduce the CPU load of the online system and shortens the response time. As will be understood, this mechanism further promotes the suggestion precision in a behavioral targeting system.

To rank the candidates in one example implementation, a Pearson coefficient function is used by the URL domain suggestion mechanism 770, which is of higher precision than other ranking functions (such as described above). As described above, an online part of the example behavioral targeting system uses a unified expansion algorithm between various attribute types, which uses a user set as a mid-result and ranks the candidates by the ratio of users. Because the Pearson coefficient function considers not only the users, but also the average of the visits, it ordinarily has higher precision.

As represented in FIG. 7, the inputs are the users' URL visit log 772 and URL domains 774. The mechanism 770 analyzes the log 772 and output the similarities between each pair of URL domains.

As represented in the flow diagram of FIG. 8, step 800 transfers the users' URL visit log 772 to a table/matrix 776 (in which arranging the users in either the columns or rows is equivalent). The value in each cell is the visit count of the corresponding domain and user. For example, in the example table below, the value in the cell [0,0] is "3", which means that in the log, the User 0 visited the Domain 0 three times.

|          | User 0 | User 1 | User 2 | ... |
|----------|--------|--------|--------|-----|
| Domain 0 | 3      | 0      | 4      |     |
| Domain 1 | 0      | 1      | 0      |     |
| Domain 2 | 1      | 0      | 0      |     |
| ...      |        |        |        |     |

Steps 802 and 804 represent selecting a pair of domains, one to process by comparing with each other domain. Step 806 calculates the Pearson coefficient similarities for the selected pair of URL domains according to the following formula:

$$sim_{u,u'} = \frac{\sum_{t \in T(u) \wedge T(u')} (R_u(t) - \overline{R_u}) \cdot (R_{u'}(t) - \overline{R_{u'}})}{\sqrt{\sum_{t \in T(u) \wedge T(u')} (R_u(t) - \overline{R_u})^2} \sqrt{\sum_{t \in T(u) \wedge T(u')} (R_{u'}(t) - \overline{R_{u'}})^2}}$$

As can be seen, the above formula calculates the coefficient similarity of two URL domains. $R_u$bar ($\overline{R_u}$) is the average value of domain u, and $R_{u'}$bar ($\overline{R_{u'}}$) is the average value of domain u'.

Step 808 repeats the comparison for other domains to compare with to the selected domain that is being processed. When the comparisons for the selected domain are finished, step 810 represents outputting the set of suggested domains in decreasing order of Pearson coefficient similarity. Thus, for a given domain Di, for example, the above formula provides the Pearson coefficient similarities between Di and each other domain, which are then output as suggested domains in decreasing order of Pearson coefficient similarity. Step 812 repeats the processing for each other domain.

Exemplary Operating Environment

Figure 9:
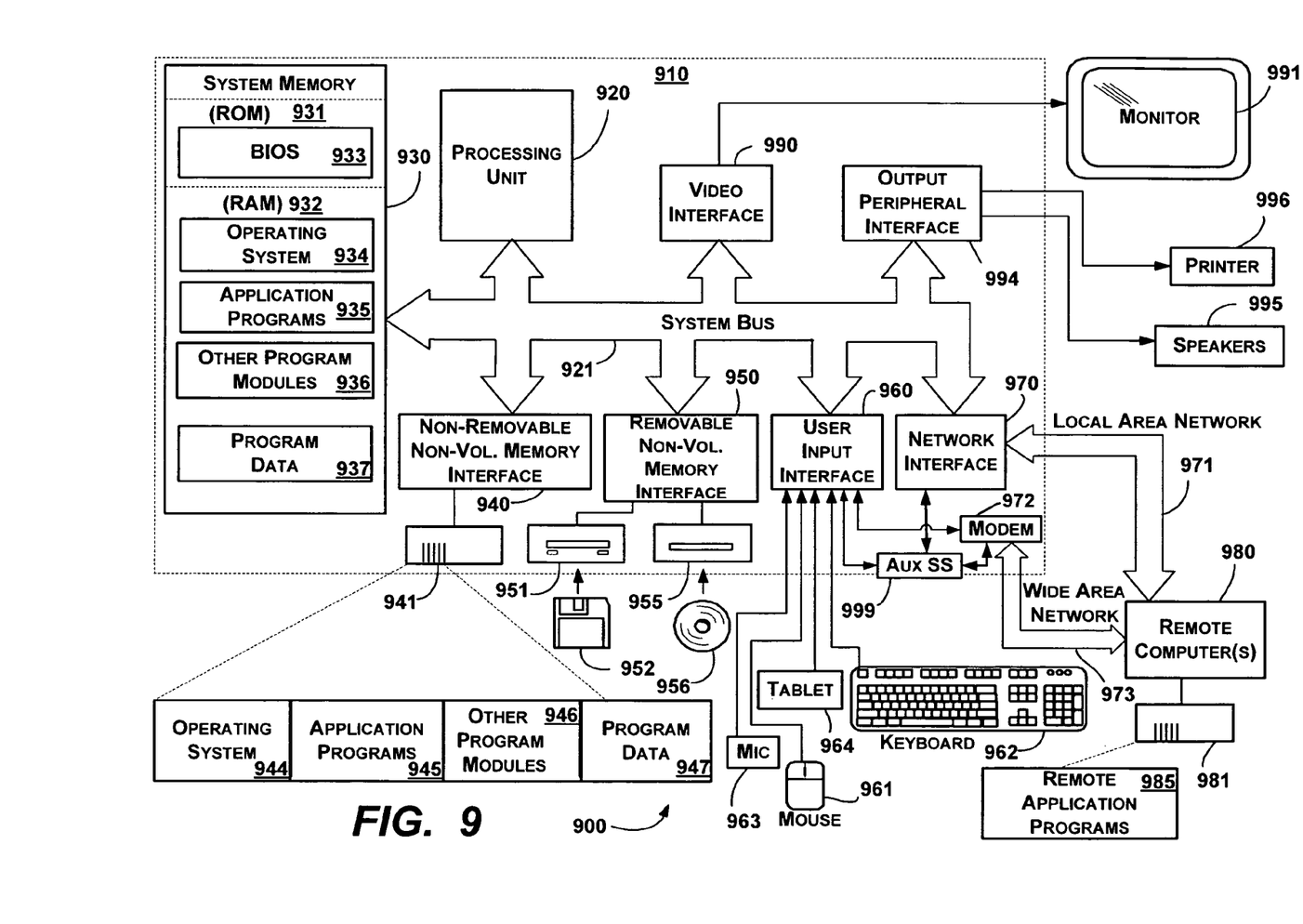
FIG. 9 shows an illustrative example of a general-purpose network computing environment into which various aspects of the present invention may be incorporated.

FIG. 9 illustrates an example of a suitable computing system environment 900 on which the examples represented in FIGS. 1-8 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an exemplary system for implementing various aspects of the invention may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936 and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 944, application programs 945, other program modules 946 and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component 974 such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 9 illustrates remote application programs 985 as residing on memory device 981. It may be appreciated that the network connections shown are exemplary and other means of establishing a communications link between the computers may be used.

An auxiliary subsystem 999 (e.g., for auxiliary display of content) may be connected via the user interface 960 to allow data such as program content, system status and event notifications to be provided to the user, even if the main portions of the computer system are in a low power state. The auxiliary subsystem 999 may be connected to the modem 972 and/or network interface 970 to allow communication between these systems while the main processing unit 920 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer-readable medium having computer executable instructions, which when executed perform steps to identify a user segment comprising a set of users to receive online advertisements, the steos comprising:

receiving an original attribute:

accessing a plurality of candidate attribute types not including the original attribute:

generating an aggregated set of users by identifying, from a cool of users, users that meet the original attributes using the aggregated set of users as a mid-result to determine user similarity scores for each of the candidate attribute types by, for each candidate attribute type:

generating a first set of users by identifying, from the pool of users, users that meet a given candidate attribute:

generating a second set of users by identifying users that meet both the given candidate attribute and the original attribute:

computing a user similarity score for the given candidate attribute based on the corresponding first set of users and second set of users:

selecting one or more of the candidate attributes based on their respective similarity scores; and generating the user segment by including therein users that meet the original attribute and including therein users that meet the one or more selected candidate attributes, and providing the user segment to an online advertising engine.

2. The computer-readable medium of claim 1 further comprising, sorting the candidate attribute types by their respective user similarity scores into sorted candidate attributes, and the selecting comprises selecting the too one or more candidate attributes in the sorted candidate attributes.

3. The computer-readable medium of claim 1 having further computer executable instructions, comprising, suggesting URL or URL patterns, or both URL and URL patterns, from a set of users and information on URLs visited by the set of users.

4. The computer-readable medium of claim 3 wherein suggesting the URL or URL patterns, or both the URL and URL patterns comprises separating at least some URLs into data represented by nodes of a tree.

5. The computer-readable medium of claim 4 wherein suggesting the URL or URL patterns, or both the URL and URL patterns comprises calculating a number users in the set of users who have visited the URL corresponding to the node, and a number of users in the set of users who have visited the URL on a sub-tree whose root is the node.

6. The computer-readable medium of claim 4 wherein suggesting the URL or URL patterns, or both the URL and URL patterns comprises calculating user set intersection between an input user set and a user set on each node.

7. The computer-readable medium of claim 1 wherein suggesting the URL or URL patterns, or both the URL and URL patterns comprises calculating URL similarity or URL pattern similarity, or both URL similarity and URL pattern similarity.

8. The computer-readable medium of claim 7 wherein suggesting the URL or URL patterns, or both the URL and URL patterns, comprises outputting the URL similarity or the URL pattern similarity in decreasing order of similarity, or outputting both the URL similarity and the URL pattern similarity each in decreasing order of similarity.

9. The computer-readable medium of claim 1 having further computer executable instructions, comprising, suggesting domains from a set of users and domains visited by the set of users.

10. The computer-readable medium of claim 9 wherein suggesting the domains from a set of users comprises converting data in a users' URL visit log to a table of users-to-domains.

11. The computer-readable medium of claim 9 wherein suggesting the domains from a set of users comprises computing similarity between pairs of domains offline with respect to an online behavioral targeting system.

12. The computer-readable medium of claim 9 wherein suggesting the domains from a set of users comprises computing a similarity between pairs of domains using a Pearson coefficient function.

13. In a computing environment including a behavioral targeting environment, a system comprising, a URL or URL pattern suggestion mechanism or both a URL and URL pattern suggestion mechanism, that inputs a set of users' visit logs corresponding to a set of users, and outputs suggested URLs or URL patterns, or both URL and URL patterns, from a set of users and a set of URLs visited by the set of users, each URL comprising a resource path with levels separated by a same path separation character, including by a process comprising:

for each URL in the set of URLs, for a given URL separating out the levels of the given URL into a data structure comprised of nodes representing the respective levels of the given URL, and adding the data structure to a tree data structure, where the tree data structure is comprised of nodes that represent levels of the URLs and node-paths in the tree data structure correspond to the resource paths of the URLs, for each node of a plurality of nodes in the tree data structure, for a given node, calculating a first set of users comprised of users in the set of users who have visited the URL corresponding to the given node and calculating a second set of users comprised of users in the set of users who have visited a URL on a sub-tree of the tree data structure whose root node is the given node, given an input set of users, for each node in the plurality of nodes in the tree data structure, for a given node, calculating a first user set intersection comprising an intersection between the input set of users and the first set of users calculated for the given node and a second intersection comprising an intersection of the input set of users and the second set of users calculated for the given node;

calculating URL similarity or URL pattern similarity, or both URL similarity and URL pattern similarity based on the first user set intersections and the second user set intersections; and outputting the URL similarity or the URL pattern similarity in decreasing order of similarity, or outputting both the URL similarity and the URL pattern similarity each in decreasing order of similarity.

14. The system of claim 13 further comprising a uniform attribute expansion mechanism of the behavioral targeting environment that expands an original attribute into an expanded attribute set, including by aggregating users that meet the original attribute into a mid-result, and using the mid-result to determine user similarity relative to each of a plurality of candidate attribute types.

15. The system of claim 14 wherein uniform attribute expansion mechanism sorts the candidate attribute types by their determined user similarity into sorted candidate attributes, and selects a subset of the sorted candidate attributes for the expanded attribute.

16. The system of claim 13 further comprising a domain suggestion mechanism that suggests domains from a set of users and domains visited by the set of users.

17. At least one computer-readable medium having computer executable instructions, which when executed perform steps, comprising:
- receiving a URL visit log and an input set of users, the URL visit log indicating URLs visited by the users in the input set of users, each URL in the visit log having a domain;
- building a table of cells comprised of the domains of the visit log crossed with the set of users;
- for each cell, computing a count of visits to the domain corresponding to the cell by the user corresponding to the cell, where the count in a cell comprises a count of the URLs in the visit log that belong to the domain corresponding to the cell and that were visited by the user corresponding to the cell; and
- suggesting domains by using the counts of the cells to compute similarity between pairs of domains and using the similarities to suggest domains in the table.

18. The computer-readable medium of claim 17 wherein computing the similarity between the pairs of domains comprises selecting two domains in the table and using a Pearson coefficient function to compute the similarity between those selected domains.

19. The computer-readable medium of claim 17 wherein the suggesting the domains takes place offline with respect to an online behavioral targeting system, and having further computer-executable instructions comprising, outputting the similarity computed for a domain with each other domain in decreasing order of similarity.

* * * * *

UNITED STATES PATENT AND TRADEMARK OFFICE
CERTIFICATE OF CORRECTION

PATENT NO.       : 7,711,735 B2
APPLICATION NO.  : 11/803503
DATED            : May 4, 2010
INVENTOR(S)      : Min Wu et al.

Page 1 of 1

It is certified that error appears in the above-identified patent and that said Letters Patent is hereby corrected as shown below:

In column 9, lines 4-5, in Claim 1, delete "computer executable" and insert
-- computer-executable --, therefor.

In column 9, line 7, in Claim 1, delete "steos" and insert -- steps --, therefor.

In column 9, line 8, in Claim 1, delete "attribute:" and insert -- attribute; --, therefor.

In column 9, line 10, in Claim 1, delete "attribute:" and insert -- attribute; --, therefor.

In column 9, line 12, in Claim 1, delete "cool" and insert -- pool --, therefor.

In column 9, line 12, in Claim 1, delete "attributes" and insert -- attribute; --, therefor.

In column 9, line 18, in Claim 1, delete "attribute:" and insert -- attribute; --, therefor.

In column 9, line 21, in Claim 1, delete "attribute:" and insert -- attribute; --, therefor.

In column 9, line 24, in Claim 1, delete "users:" and insert -- user; --, therefor.

In column 9, line 35, in Claim 2, delete "too" and insert -- top --, therefor.

In column 9, line 39, in Claim 3, delete "computer executable" and insert
-- computer-executable --, therefor.

In column 10, line 2, in Claim 9, delete "computer executable" and insert
-- computer-executable --, therefor.

In column 11, lines 6-7, in Claim 17, delete "computer executable" and insert
-- computer-executable --, therefor.

Signed and Sealed this
Twenty-sixth Day of July, 2011

David J. Kappos
*Director of the United States Patent and Trademark Office*